(12) United States Patent
Patwari et al.

(10) Patent No.: US 8,989,764 B2
(45) Date of Patent: Mar. 24, 2015

(54) ROBUST LOCATION DISTINCTION USING TEMPORAL LINK SIGNATURES

(75) Inventors: Neal Patwari, Salt Lake City, UT (US); Sneha Kasera, Salt Lake City, UT (US)

(73) Assignee: The University of Utah Research Foundation, Salt Lake City, UT (US)

( * ) Notice: Subject to any disclaimer, the term of this patent is extended or adjusted under 35 U.S.C. 154(b) by 1130 days.

(21) Appl. No.: 12/676,492

(22) PCT Filed: Sep. 5, 2008

(86) PCT No.: PCT/US2008/075369
§ 371 (c)(1),
(2), (4) Date: Mar. 4, 2010

(87) PCT Pub. No.: WO2009/033001
PCT Pub. Date: Mar. 12, 2009

(65) Prior Publication Data
US 2010/0207732 A1    Aug. 19, 2010

Related U.S. Application Data

(60) Provisional application No. 60/970,094, filed on Sep. 5, 2007.

(51) Int. Cl.
*H04W 24/00*    (2009.01)
*G01S 5/02*     (2010.01)
(Continued)

(52) U.S. Cl.
CPC ............ *G01S 5/0252* (2013.01); *H04W 64/00* (2013.01); *H04L 63/1466* (2013.01); *H04W 12/12* (2013.01); *H04W 84/18* (2013.01)
USPC .................................... 455/456.1; 455/404.2

(58) Field of Classification Search
CPC ...................................................... G01S 5/0252
USPC ............................................ 455/412.1, 456.1
See application file for complete search history.

(56) References Cited

U.S. PATENT DOCUMENTS 5,604,806 A    2/1997  Hassan
6,301,324 B1  10/2001  Pearson
(Continued)

FOREIGN PATENT DOCUMENTS

WO    WO2010030956    3/2010

OTHER PUBLICATIONS

International Search Report for PCT/US2009/056718, mailed Aug. 26, 2010.
(Continued)

*Primary Examiner* — David Bilodeau
(74) *Attorney, Agent, or Firm* — Workman Nydegger

(57) ABSTRACT

The ability of a receiver to determine when a transmitter has changed location is important for energy conservation in wireless sensor networks, for physical security of radio tagged objects, and for wireless network security in detection of replication attacks. In embodiments of the present invention, a measured temporal link signature is determined to uniquely identify the link between a transmitter and a receiver. The temporal link signature is an impulse response of a transmitted signal from the transmitter over a channel between the transmitter and a receiver over a channel. When the transmitter changes location, or if an attacker at a different location assumes the identity of the transmitter, the proposed link distinction methodology reliably detects the change in the physical channel. This detection can be performed at a single receiver or collaboratively by multiple receivers.

12 Claims, 6 Drawing Sheets

(51) Int. Cl.
*H04W 64/00* (2009.01)
*H04L 29/06* (2006.01)
*H04W 12/12* (2009.01)
*H04W 84/18* (2009.01)

(56) References Cited

U.S. PATENT DOCUMENTS

| | | | |
|---|---|---|---|
| 6,442,392 B2 * | 8/2002 | Ruutu et al. | 455/456.1 |
| 6,553,120 B1 | 4/2003 | Vaudenay | |
| 6,744,253 B2 | 6/2004 | Stolarczyk | |
| 7,064,660 B2 | 6/2006 | Perkins | |
| 7,075,424 B1 | 7/2006 | Sundaresan et al. | |
| 7,307,575 B2 | 12/2007 | Zemany | |
| 7,317,419 B2 | 1/2008 | Sugar | |
| 7,570,063 B2 | 8/2009 | Van Veen | |
| 7,856,656 B1 | 12/2010 | Kharvandikar | |
| 7,890,060 B2 | 2/2011 | Lehtinen | |
| 8,138,918 B2 | 3/2012 | Habib | |
| 8,280,046 B2 | 10/2012 | Rudolf | |
| 8,502,728 B2 | 8/2013 | Joshi | |
| 8,503,673 B2 | 8/2013 | Patwari | |
| 8,515,061 B2 | 8/2013 | Patwari | |
| 2002/0089450 A1 * | 7/2002 | Dowdle et al. | 342/453 |
| 2002/0168943 A1 | 11/2002 | Callaway | |
| 2003/0048223 A1 | 3/2003 | Kezys | |
| 2003/0064733 A1 * | 4/2003 | Okanoue et al. | 455/456 |
| 2003/0117985 A1 | 6/2003 | Fujii | |
| 2003/0214410 A1 | 11/2003 | Johnson | |
| 2004/0170280 A1 | 9/2004 | Fekri | |
| 2004/0190718 A1 * | 9/2004 | Dacosta | 380/247 |
| 2005/0195109 A1 | 9/2005 | Davi | |
| 2005/0228902 A1 | 10/2005 | Lienhart | |
| 2005/0258988 A1 | 11/2005 | Jiang | |
| 2005/0285792 A1 | 12/2005 | Sugar | |
| 2006/0164298 A1 | 7/2006 | Azuma | |
| 2006/0193284 A1 | 8/2006 | Stieglitz | |
| 2007/0026935 A1 | 2/2007 | Wolf | |
| 2007/0035437 A1 | 2/2007 | Steinway | |
| 2007/0036353 A1 | 2/2007 | Reznik | |
| 2007/0060098 A1 | 3/2007 | McCoy | |
| 2007/0086489 A1 | 4/2007 | Carlson | |
| 2007/0165845 A1 | 7/2007 | Ye | |
| 2007/0177729 A1 | 8/2007 | Reznik | |
| 2008/0090572 A1 | 4/2008 | Cha | |
| 2008/0123851 A1 | 5/2008 | Guccione | |
| 2008/0169961 A1 | 7/2008 | Steinway | |
| 2008/0244094 A1 | 10/2008 | Rich | |
| 2009/0040952 A1 | 2/2009 | Cover | |
| 2009/0052663 A1 | 2/2009 | Hammond | |
| 2009/0141900 A1 | 6/2009 | Ye | |
| 2009/0161127 A1 | 6/2009 | Schweid | |
| 2009/0319819 A1 | 12/2009 | Haba | |
| 2010/0067701 A1 | 3/2010 | Patwari | |
| 2010/0309051 A1 * | 12/2010 | Moshfeghi | 342/378 |
| 2011/0222421 A1 | 9/2011 | Jana | |
| 2011/0273321 A1 | 11/2011 | Joshi | |
| 2011/0280397 A1 | 11/2011 | Patwari | |
| 2012/0004889 A1 | 1/2012 | Spiesberger | |
| 2012/0009882 A1 | 1/2012 | Patwari | |
| 2012/0300864 A1 | 11/2012 | Merlin et al. | |
| 2013/0003077 A1 | 1/2013 | Suehira | |
| 2013/0011858 A1 | 1/2013 | O'Connor et al. | |

OTHER PUBLICATIONS

Written Opinion for PCT/US2009/056718, mailed Aug. 26, 2010.
Zang Li, Wenyuan Xu, Rob miller, Wade Trappe, Securing Wireless Systems via Lower Layer Enforcements, Sep. 29, 2006, pp. 33-41.
Mathur, et al. "Radio-telepathy: Extracting a Secret Key from an Unauthenticated Wireless Channel" MboiCom, Sep. 14, 2008 ACM, pp. 128-139.
International Search Report for PCT/US2009/056751, mailed Apr. 15, 2010.
Written Opinion for PCT/US2009/056751, mailed Apr. 15, 2010.
Tadayoshi, Kohno et al., "Remote Physical Device Fingerprinting" *IEEE*, Apr. 2005, pp. 93-108.
Liran, Ma et al, "A Hybride Rogue Access Point Protection Framework . . . " *IEEE*, Apr. 2008, pp. 1894-1902.
International Search Report for PCT/US2009/056743, mailed Apr. 26, 2010.
Written Opinion for PCT/US2009/056743, mailed Apr. 26, 2010.
U.S. Appl. No. 12/558,106, Jan. 23, 2012, Office Action.
U.S. Appl. No. 12/558,106, Sep. 6, 2012, Notice of Allowance.
U.S. Appl. No. 13/063,659, Dec. 3, 2012, Office Action.
U.S. Appl. No. 12/558,106, Dec. 12, 2012, Notice of Allowance.
U.S. Appl. No. 12/558,106, Mar. 4, 2013, Notice of Allowance.
U.S. Appl. No. 13/063,646, Feb. 22, 2013, Notice of Allowance.
U.S. Appl. No. 13/178,295, Mar. 20, 2013, Office Action.
International Preliminary Report on Patentability for PCT/US2008/075369, mailed Jun. 24, 2010.
U.S. Appl. No. 13/063,687, Apr. 15, 2013, Office Action.
U.S. Appl. No. 13/063,646, Apr. 5, 2013, Notice of Allowance.
U.S. Appl. No. 13/063,659, Apr. 22, 2013, Notice of Allowance.
U.S. Appl. No. 12/558,106, Apr. 15, 2013, Notice of Allowance.
U.S. Appl. No. 13/063,687, Mar. 21, 2014, Final Office Action.
U.S. Appl. No. 13/178,295, Oct. 7, 2013, Final Office Action.
U.S. Appl. No. 13/178,295, May 7, 2014, Notice of Allowance.

* cited by examiner

ROBUST LOCATION DISTINCTION USING TEMPORAL LINK SIGNATURES

CROSS-REFERENCE TO RELATED APPLICATIONS

The present invention claims priority to and the benefit of Provisional Application No. 60/970,094 to Patwari et al., entitled "Robust Location Distinction Using Temporal Link Signatures," filed on Sep. 5, 2007, which is herein incorporated by reference in its entirety.

FIELD OF INVENTION

The present invention relates to the field of wireless networks. Specifically, the present invention relates to a temporal link signature that uniquely identifies the link between a transmitter and a receiver.

THE RELEVANT TECHNOLOGY

Location distinction is critical in many wireless network situations, including motion detection in wireless sensor networks, physical security of objects using wireless tags, and information security against replication attacks. Some applications requiring location distinction and motion detection include wireless sensor networks, active radio frequency identification (RFID), and secure wireless networks.

For instance, in wireless sensor networks, sensor location can be associated with measured sensor data for use in geographic location-based routing methods. Some wireless networks are deployed purely to be able to locate active RF transmitter tags placed in objects for logistical purposes, such as those used in warehouses or factories. In one particular application, location estimation must be done in an energy efficient manner, especially for networks of sensors with small batteries that must last for years.

In addition, active wireless tags can be used to protect the physical security of objects. For example, RFID tags are fast replacing bar-codes and are used as a means for improved logistics and security for products in stores and warehouses. Active RFID in particular is desired for its greater range, but a tag must be in range of multiple base stations (BS) in order to be able to estimate its location. Location distinction is critical to provide a warning and to be able to focus resources (e.g., security cameras, personnel) on moving objects.

Security is of utmost concern when protecting wireless networks. In particular, wireless networks can be vulnerable to medium access control (MAC) address spoofing. That is, an adversary, at a different location, can claim to be another node by spoofing its address. Traditional cryptography methods can be implemented to prevent this spoofing; however, these methods are susceptible to node compromise.

As described above, many applications including those listed above require location distinction. However, existing techniques fail to do so in an efficient and robust manner. For example the use of accelerometers, Doppler, and received signal strength each have their own disadvantages, as described below.

An accelerometer detects changes in velocity. However, accelerometers can be cost prohibitive. The additional device cost of an accelerometer may be acceptable for protection of high-value assets, but would be prohibitive for applications such as bar-code replacement and large-scale sensor networks. Furthermore, an accelerometer needs continuous power that would excessively drain battery power since the accelerometer cannot detect motion from a sleep state.

Doppler is the frequency shift caused by the velocity of a transmitter and can be used to detect movement of an object. However, the use of Doppler measurements is limited to situations only in which the object is moving. That is, Doppler measurements provide limited information after object has stopped moving. Thus, transmission of a Doppler signal could not be intermittent like a packet radio, and would require excessive use of battery power.

Further, received signal strength (RSS) can be used to detect movement of a transmitter. However, RSS measurements vary due to small-scale and frequency-selective fading, such that its use in location distinction requires multiple measurements at different receivers. However, for wireless sensor networks, multi-node collaboration is expensive in terms of energy requirements and usage.

SUMMARY OF THE INVENTION

Accordingly, what is needed is an energy efficient manner for performing location distinction in wireless sensor networks.

In one embodiment, a radio channel identifier defines a signature. Specifically, the radio channel identifier comprises a temporal link signature between a transmitter and a receiver. The transmitter is located at a first location. The receiver is located at a second location. The temporal link signature comprises a characteristic of an impulse response of a transmitted signal from the transmitter over a channel between the transmitter and the receiver.

In another embodiment, a method for detecting a change in transmitter location is described.

The method begins by determining a baseline temporal link signature of a channel between a transmitter located at a first location and a receiver at a second location. The baseline temporal link signature is characteristic of a first impulse response of at least one transmitted signal over the channel. A signal is received at the receiver, wherein the signal is based on a second transmitted signal from an unknown transmitter at an unknown location. The unknown transmitter is presumably the transmitter. A temporal link signature is determined based on the signal that is received. The temporal link signature is characteristic of an impulse response of the second transmitted signal over an unknown channel between the unknown transmitter and the receiver. A change between the first location and the second location is detected by determining if the temporal link signature is different from the baseline temporal link signature.\

BRIEF DESCRIPTION OF THE DRAWINGS

Exemplary embodiments are illustrated in referenced figures of the drawings which illustrate what is regarded as the preferred embodiments presently contemplated. It is intended that the embodiments and figures disclosed herein are to be considered illustrative rather than limiting.

DETAILED DESCRIPTION OF THE PREFERRED EMBODIMENTS

Reference will now be made in detail to the preferred embodiments of the present invention, a method and system for performing location distinction in a wireless network for purposes of detecting a change in transmitter or receiver location, or a combination of both. While the invention will be described in conjunction with the preferred embodiments, it will be understood that they are not intended to limit the invention to these embodiments. On the contrary, the invention is intended to cover alternatives, modifications and equivalents which may be included within the spirit and scope of the invention as defined by the appended claims.

Accordingly, embodiments of the present invention provide for a robust location distinction mechanism that uses a physical layer characteristic of the radio channel between a transmitter and a receiver, that comprises a temporal link signature. The temporal link signature is the sum of the effects of the multiple paths from the transmitter to the receiver, each with its own time delay and complex amplitude (e.g., real or complex). Such a signature changes when the relative position between the transmitter and receiver changes, because the multiple paths in the link change with the positions of the endpoints of the radio link. Embodiments of the present invention are capable of detecting the change in signature. As a result, additional response steps may be implemented based on the change of the temporal link signature.

Figure 1:
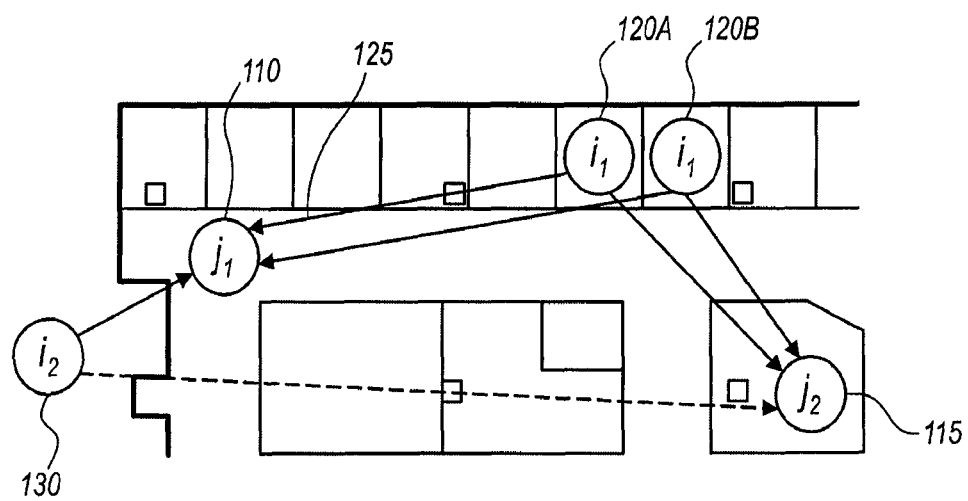
FIG. 1 is a network illustrating a robust location distinction mechanism, in accordance with one embodiment of the present invention.

Method and System for Location Distinction:

FIG. 1 illustrates a network 100 including transmitters i and receivers j that is capable of performing location distinction, in accordance with one embodiment of the present invention. In particular, the network 100 illustrates a known relationship between receiver $j_1$ at node 110 and transmitter $i_1$ at node 120A at an initial state. That is, transmitter $i_1$ is located at a first location node 120A and receiver $j_1$ is located at a second location, node 110. The present embodiment is capable of determining if a temporal link signature of the radio channel 125 between transmitter $i_1$ at node 120A and receiver $j_1$ at node 110 has changed. A change in the temporal link signature may indicate that either transmitter $i_1$ or receiver $j_1$ has moved, that both transmitter $i_1$ or receiver $j_1$ have moved, or that an adversary transmitter $i_2$ at node 130 is impersonating transmitter $i_1$ at node 120A.

In particular, in the network 100, a radio link exists between transmitter $i_1$ at node 120A and receiver $j_1$ at node 110. The receiver $j_1$ can measure and record the temporal link signature of link $(i_1,j_1)$. When transmitter $i_1$ moves to node 120B, the present embodiment can then distinguish the new link signature from one or more previously recorded link signatures, and declare that transmitter $i_1$ has moved, in one embodiment.

Alternatively, if an adversary, transmitter $i_2$, impersonates transmitter $i_1$ from node 130, the adversary's transmission to receiver $j_1$ at node 110 will be detected to be from a different location. Thereafter, an appropriate action may be taken.

In still another embodiment, while the detection of a temporal link signature change between transmitter $i_1$ and receiver $j_1$ can be reliably performed at one receiver, receiver $j_2$ at node 115 can also participate in the detection process for higher reliability and robustness. Specifically, measurements at multiple receivers can be used to achieve even higher robustness of location distinction.

In contrast to existing techniques, location distinction using temporal link signatures does not require continuous operation, in one embodiment. That is, a sensor transmitting a signal can schedule one or more sleep periods, and a wireless network can send packets intermittently. When awakened from sleep or upon reception of the subsequent packet, a receiver can detect that a neighboring transmitter has moved since its past transmission. As an added advantage, temporal link signatures in embodiments of the present invention can be measured at a single receiver and require no additional complexity at the transmitter, which keeps tag cost and energy consumption low.

For secure wireless networks, such as that illustrated in network 100, temporal link signatures are particularly robust to impersonation attacks because of three physical barriers. First, an attacker (e.g., transmitter $i_2$ at node 130) cannot measure the link signature of the legitimate links between a transmitter and corresponding receivers, unless it is at exactly the same location as all receivers. As such, the link signature acts as a form of secrecy, which in combination with the reciprocity of the channel 125 impulse response, can be used to obtain a shared secret for purposes of a secure wireless communication. Second, even if an attacker (transmitter $i_2$) can measure a link signature, it will not have the same link signature at the receiver $j_1$ unless the attacker (e.g., transmitter $i_2$) is at exactly the same location as the legitimate transmitter (e.g., transmitter $i_1$), which is difficult, if not impossible to achieve. Furthermore, an attacker (transmitter $i_2$) can change its measured link signature, but cannot 'spoof' an arbitrary link signature.

These three physical barriers exist because the link between a legitimate transmitter (e.g., transmitter $i_1$) and the attacker's receiver (e.g., receiver at node 130) is a different physical channel compared to the one between the legitimate transmitter (e.g., transmitter $i_1$) and legitimate receiver (e.g., receiver $j_1$ at node 110). Further, any signal sent by the attacker (e.g., transmitter $i_2$) to the legitimate receiver (e.g., receiver $j_1$ at node 110) must be filtered by a third different physical channel between them.

Figure 2:
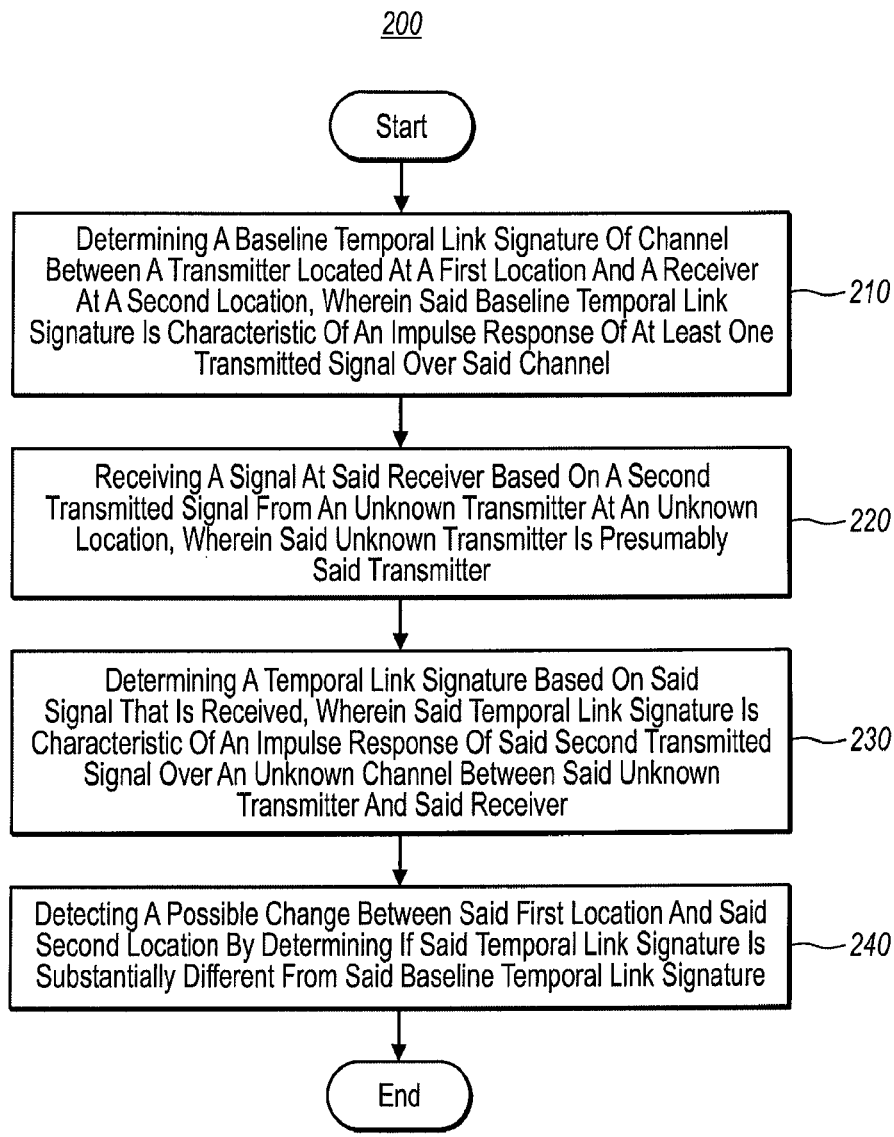
FIG. 2 is a flow diagram illustrating a method for location distinction, in accordance with one embodiment of the present invention.
Figure 3:
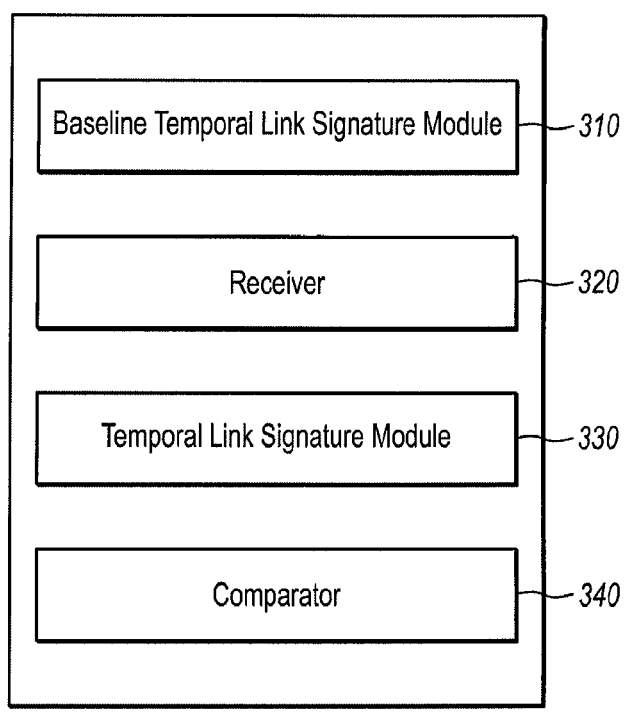
FIG. 3 is a system capable of implementing a method for location distinction, in accordance with one embodiment of the present invention.

FIGS. 2 and 3 together illustrate a method and system for performing location distinction in order to determine a change in the physical relationship between a transmitter and a receiver, in accordance with one embodiment of the present invention. For instance, the method and system of FIGS. 2 and 3 can be used to determine if either the transmitter or receiver, or a combination of both, has moved from a previous location.

In particular, FIG. 2 is a flow chart 200 illustrating a method for location distinction, in accordance with one embodiment of the present invention. The system 300 of FIG. 3 is capable of implementing the method of FIG. 2, in accordance with one embodiment of the present invention. In particular, system 300 can be located at a receiver (e.g., receiver $j_1$ or receiver $j_2$), in one embodiment. In another embodiment, system 300 can be located at a remote location separate from either receiver $j_1$ or receiver $j_2$ in a multiple receiver network, or in a single receiver network.

Returning to FIG. 2, at 210, a baseline temporal link signature of channel between a transmitter located at a first location and a receiver at a second location is determined. The baseline temporal link signature is characteristic of an impulse response of at least one transmitted signal over the channel, such as a first transmitted signal. In one embodiment, the baseline temporal link signature module 310 of system 300 determines the baseline temporal link signature.

At 220, a signal is received at the receiver. The received signal is based on a second transmitted signal from an unknown transmitter at an unknown location. In one embodiment, the unknown transmitter is presumably the transmitter associated with the baseline temporal link signature. In one embodiment, the receiver 320 receives the signal from the unknown transmitter.

At 230, a temporal link signature is determined. The temporal link signature is based on the received signal. In addition, the temporal link signature is characteristic of an impulse response of the second transmitted signal over an unknown channel between the unknown transmitter and the receiver. In one embodiment, the temporal link signature module 330 determines the temporal link signature.

At 240, a change between the first location and the second location is determined by determining if the temporal link signature from 230 is substantially different from the baseline temporal link signature. That is, in one embodiment, assuming that the unknown transmitter is the same transmitter used for determining the baseline temporal link signature, if the temporal link signature is substantially different from the baseline, then the location of the transmitter has changed, assuming the receiver location stays constant. In another embodiment, an intruder can be detected when the temporal link signature is substantially different from the baseline, such that the intruder is trying to impersonate the transmitter used for the baseline temporal link signature. In one embodiment, the comparator 340 determines if there has been a change between the two temporal link signatures.

Temporal Link Signature

The power of the temporal link signature comes from the variability in the multiple paths over which radio waves propagate on a link. A single radio link is composed of many paths (also referred to as multiple paths or multi-paths) from the transmitter to the receiver. For example, referring to FIG. 1, the radio link over channel 125 is composed of many paths from transmitter $i_1$ to receiver $j_1$. These multiple paths are caused by the reflections, diffractions, and scattering of the radio waves interacting with the physical environment. Each path has a different length, so a wave propagating along that path takes a different amount of time to arrive at the receiver. Each path has attenuation caused by path losses and interactions with objects in the environment, so each wave undergoes a different attenuation and phase shift. At the receiver, many copies of the transmitted signal arrive, but each copy arrives with a different time delay, and with a different amplitude and phase. The sum of these time delayed, scaled, and phase shifted transmitted signals is the received signal.

As will be explained below in detail, the temporal link signature is based on a plurality of time delays and a plurality of amplitudes of the multipath components of the transmitted signal over the channel 125. In one embodiment, the temporal link signature comprises an impulse response of a transmitted signal over the channel 125 between the transmitter $i_1$ and receiver $j_1$, wherein the impulse response is based on the plurality of time delays and the plurality of amplitudes of the multipath components. For instance, the impulse response can be configured as a list, or vector of the plurality of time delays and plurality of amplitudes. In one embodiment, the impulse response is a complex-valued impulse response, where the amplitude has both a magnitude and a phase angle. In another embodiment, the impulse response is a real-valued impulse response, wherein only the magnitude of the amplitude is considered.

Since the received signal is a linear combination of the transmitted signal, we can consider the radio channel or link as a linear filter. For the link or channel in between transmitter i and receiver j, the channel impulse response (CIR), denoted $h_{i,j}(t)$, is given by Eq. 1, as follows:

$$h_{i,j}(\tau) = \sum_{l=1}^{L} \alpha_l e^{j\phi_l} \delta(\tau - \tau_l), \tag{1}$$

In particular, $\alpha_l$ and $\phi_l$ are the amplitude and the phase of the lth multipath component, $\tau_l$ is the time delay, L is the total number of multipaths, and $\delta(\tau)$ is the Dirac delta function. Essentially, the filter impulse response is the superposition of many impulses, each one representing a single path in the multiple paths of a link. Each impulse is delayed by the path delay, and multiplied by the amplitude and phase of that path.

The received signal, r(t), is then the convolution of the channel filter and the transmitted signal s(t), as described in Eq. 2.

$$r(t)=s(t)*h_{i,j}(t), \tag{2}$$

All receivers measure r(t) in order to demodulate the information bits sent by the transmitter.

Estimation of the Temporal Link Signature

In one embodiment, the received signal, r(t), is used to make a band-limited estimate of $h_{i,j}(t)$. If the bits are correctly demodulated, s(t), the transmitted signal, can be recreated in the receiver. In general, estimating $h_{i,j}(t)$ from known r(t) and s(t) in Eq. 2 is a de-convolution problem, however, in one embodiment, a de-convolution process need not be performed.

For instance, once the transmitted signal, s(t), is known, the transmitter can be identified. Specifically, the transmitter is associated with an identifying signal (e.g., RFID) that is periodically transmitted. In that way, a transmitter can be distinguished from a plurality of transmitters based on the identifying signal. In one embodiment, the identifying signal is also used for purposes of determining the temporal link signature, although this is not a requirement. For instance, one or more signals that are different than the identifying signal may be transmitted for purposes of determining the temporal link signature.

In particular, generally, digital signals have power spectral densities which are flat inside the band (the frequency range of the channel) in order to maximize spectral efficiency. Specifically, $|S(f)|^2$ is approximately equal to a known constant, denoted $P_s$, for all f within the band. In addition, an approximation of $h_{i,j}(t)$ is sufficient, as there is no need to exactly recreate $h_{i,j}(t)$, in one embodiment.

As a result, in one embodiment, the temporal link signature is calculated using only convolution, rather than de-convolution. To show this, Eq. 2 is rewritten in the frequency domain below as Eq. 2A.

$$R(f)=S(f)H_{i,j}(f), \tag{2A}$$

In Eq. 2A, R(f), S(f), and $H_{i,j}(f)$ are the Fourier transforms of r(t), s(t), and $h_{i,j}(t)$, respectively.

Thereafter, R(f) is multiplied with the complex conjugate of the Fourier transform of the re-created transmitted signal, S*(f), in Eq. 3.

$$S^*(f)R(f)=|S(f)|^2 H_{i,j}(f), \tag{3}$$

Note that this multiplication in the frequency domain is a convolution in the time domain. As $|S(f)|^2$ is nearly constant within the band, Eq. 3 is a band limited version of $H_{i,j}(f)$.

Finally, the temporal domain is recovered from Eq. 3 by taking the inverse Fourier transform. The impulse response estimate obtained from the nth received packet from transmitter i at receiver j is denoted below in Eq. 3A, where $\mathfrak{F}^{-1}\{-\}$ indicates an inverse Fourier transform is performed.

$$h_{i,j}^{(n)}(t) = \frac{1}{P_S}\mathfrak{F}^{-1}\{S^*(f)R(f)\} = \frac{1}{P_S}\mathfrak{F}^{-1}\{|S(f)|^2 H_{i,j}(f)\} \quad (3A)$$

Since the received signal is sampled, the following sampled impulse response vector can be determined in Eq. 4.

$$h_{i,j}^{(n)} = [h_{i,j}^{(n)}(0), \ldots, h_{i,j}^{(n)}(\kappa T_r)]^T, \quad (4)$$

In Eq. 4, $T_r$ is the sampling rate at the receiver, and $\kappa+1$ is the number of samples. As shown in Eq. 4, the impulse response includes a plurality of time delays and amplitudes of the multipath components of the transmitted signal over the channel. As described previously, the impulse response may be a complex-valued impulse response, where the amplitude has both a magnitude and a phase angle, or the impulse response may be a real-valued impulse response, where the amplitude only has a magnitude.

In one embodiment, the calculation of Eq. 4 can be done regardless of modulation, but for particular modulation types, the process is even easier. For example, consider receivers for orthogonal frequency division multiplexing (OFDM)-based standards, such as in IEEE 802.11a/g and 802.16. Such receivers can be readily adapted to calculate temporal link signatures since the signal amplitude and phase in each sub-channel provides a sampled version of the Fourier transform of the signal. In effect, the Fourier transform operation is already implemented, and R(f) is directly available. In one embodiment, calculation of the temporal link signature requires an additional inverse FFT operator.

In embodiments of the present invention, the calculation necessary for the computation of temporal link signatures can be performed in existing code-division multiple access (CDMA) cellular base station receivers, in access points for wireless local area networks (WLANs) operating on the 802.11b standard, and ultra-wideband (UWB) receivers. Specifically, CDMA receivers first correlate the received signal with the known pseudo-noise (PN) signal. Then, the correlator output in a rake receiver is used, which adds in the power from each multipath component. In one embodiment, the temporal link signature is just the average of the correlator output over the course of many bits. UWB receivers also measure a signal which shows an approximate impulse response. In either case, little or no additional calculation would be required to implement a temporal link signature-based method for these standard PHY protocols.

Normalization

When describing time measurements, transmitters and receivers are typically not synchronized. As such, the temporal link signature, $h_{i,j}^{(n+1)}(t)$ has only a relative notion of time t. If the next temporal link signature on the same link (i,j), $h_{i,j}^{(n+1)}(t)$, is equal to $h_{i,j}^{(n)}(t+\Delta t)$, where $\Delta t$ is a significant offset compared to the duration of the link signature, the temporal link difference between the nth and n+1st measurement will be very high, simply because of the lack of synchronization.

To address the synchronization problem, normalization is performed, in one embodiment. That is, the time delay axis is normalized at each new link signature measurement by setting the time delay of the line-of-sight (LOS) multipath to be zero. In Eq. 1, this means that $\tau_1=0$, and can be implemented with a threshold detector. That is, when a measured impulse response first exceeds a threshold, the delay is set to 0. In another embodiment, all link signatures in this discussion are time-delay normalized.

In another embodiment, for purposes of replication attack detection, robustness to attacks requires that signatures be also normalized by amplitude. This is because a transmit power can be easily increased or decreased. For purposes of clarity, in this specification, normalized link signatures refers to amplitude normalization. However, other embodiments of the present invention are well suited to applications in which amplitude normalization is not required.

In the present embodiment, for a normalized link signature, the measured impulse response is normalized to unit norm in Eq. 5.

$$\bar{h}_{i,j}^{(n)} = h_{i,j}^{(n)}/\|h_{i,j}^{(n)}\| \quad (5)$$

In Eq. 5, $\|\cdot\|$ indicates the Euclidean ($l_2$) norm. For purposes of the present invention, $h_{i,j}^{(n)}$ refers to the link signature. In other embodiments, when using a normalized link signature, the term $\bar{h}_{i,j}^{(n)}$ is substituted into any expression in place of $h_{i,j}^{(n)}$.

Particular Location Distinction Methodology

Figure 4:
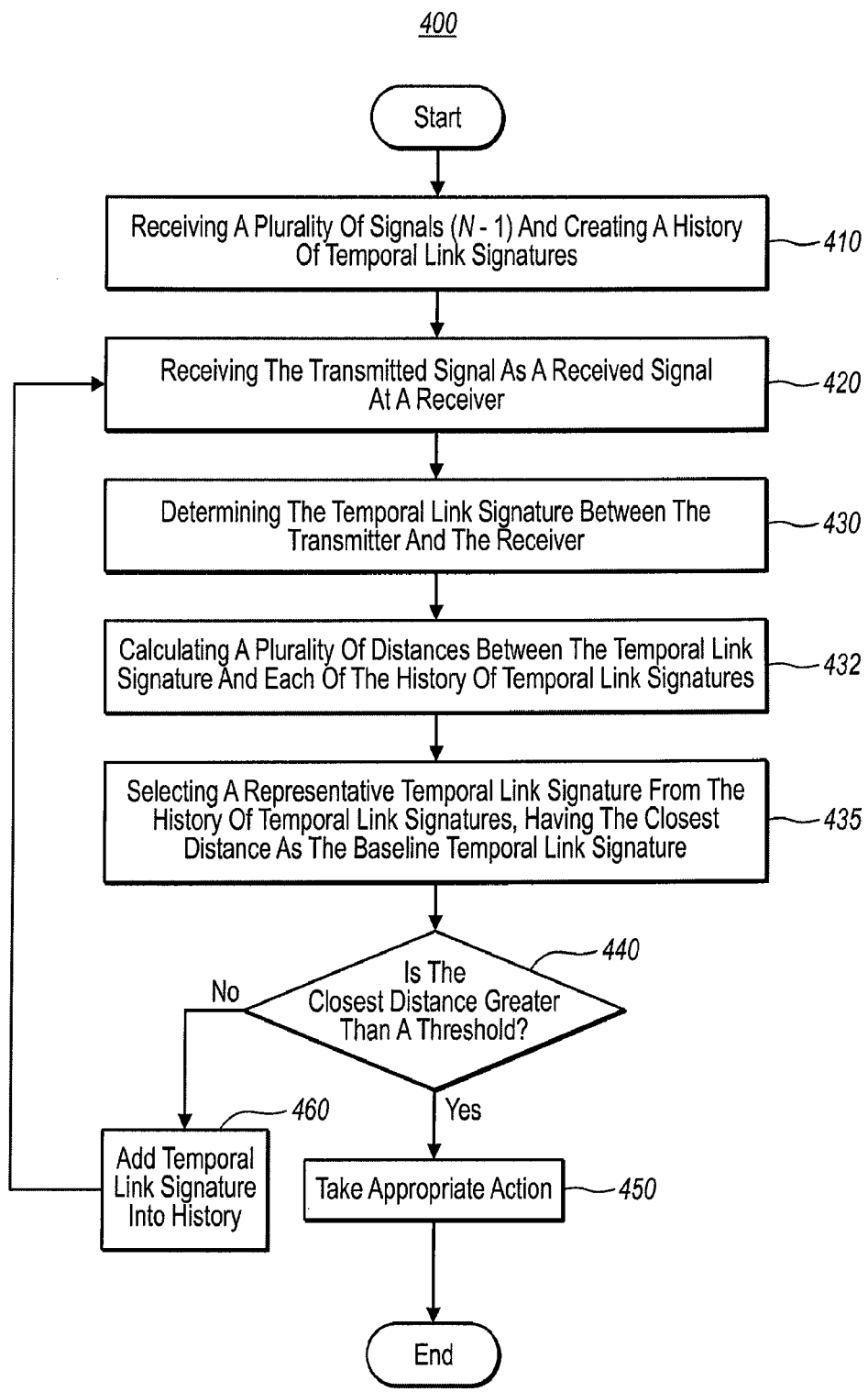
FIG. 4 is a flow diagram illustrating a particular implementation of a method for location distinction, in accordance with one embodiment of the present invention.

FIG. 4 is a flow chart 400 illustrating a method for location distinction, in accordance with one embodiment of the present invention. The method illustrated in FIG. 4 can be used to determine movement of either a transmitter, or receiver, or combination of the two. In addition, the method of FIG. 4 can be used to determine when a replication attack is detected, in another embodiment. The method of flow chart 400 can be implemented within an environment described in FIG. 3. As such, a receiver is designated as j, and a transmitter is designated as i.

At 410, a plurality of signals (N−1) is received at a receiver j and a history of temporal link signatures can be created. That is, at least one temporal link signature is used to determine a baseline temporal link signature. More specifically, given receiver j and nodes i∈ $\mathcal{N}_j$ (where $\mathcal{N}_j$ is the set of neighbors of j), a history of N−1 link signatures is measured and stored, as Eq. 5A.

$$\mathcal{H}_{i,j} = \{h_{i,j}^{(n)}\}_{n=1}^{N-1} \quad (5A)$$

These histories are assumed to be recorded while transmitter i is not moving and not under a replication attack, in one embodiment. Still, $h_{i,j}^{(n)}$ will differ due to normal temporal variations in the radio channel. To quantify this variation, receiver j calculates the historical average difference ($\sigma_{i,j}$) between the N−1 measurements in $\mathcal{H}_{i,j}$, as presented below in Eq. 7.

At 420, the Nth measurement $h^{(N)}$ is then taken. That is, the Nth transmitted signal is received as a received signal at the receiver j. More specifically, the received signal is based on an Nth transmitted signal from an unknown transmitter from an unknown location. It is presumed that the unknown transmitter is the transmitter i, but it is not necessarily the case, as will be described below. The presumption can be made, in one embodiment, if the transmitted signal, as demodulated from the received signal, matches the identifying signal of the transmitter i. For instance, the transmitted signal may be used for both identifying transmitter i, and for purposes of determining the temporal link signature. In another case, a separate signal is used for identification purposes.

Also, at 430, the temporal link signature of the Nth transmitted signal is determined. The temporal link signature is characteristic of an impulse response of the Nth transmitted signal over the unknown channel between the unknown transmitter and the receiver j.

In one embodiment, the temporal link signature is estimated, as is provided in Eq. 4. More specifically, in the present application, $h^{(N)}$ denotes the Nth measurement of the temporal link signature as given in Eq. 4. The subscript $_{i,j}$ is left out since it isn't known yet that the signature matches with link (i,j) between the transmitter i and the receiver j.

At 432, a plurality of distances between the temporal link signature, as determined by the Nth transmitted signal, and each of the history of temporal link signatures is calculated, or determined.

Thereafter, at 435, a representative temporal link signature from the history of temporal link signatures is selected that is associated with the closest distance calculated. In this case, the representative temporal link signature acts as the baseline temporal link signature. Moreover, the distance $d_{i,j}$ between $h^{(N)}$ and the history $\mathcal{H}_{i,j}$ that is associated with the representative temporal link signature is calculated using Eq. 6.

$$d_{i,j} = \frac{1}{\sigma_{i,j}} \min_{h \in H_{ij}} \|h - h^{(N)}\| \qquad (6)$$

Eq. 6 is the normalized minimum Euclidean ($l_2$) distance between the Nth measurement and the history vectors. In other embodiments, many other distance measurements are possible, but in the present embodiment, $l_2$ is chosen as a simple proof-of-concept measure.

Next, at decision step 440, the difference, or distance $d_{i,j}$, is compared to a threshold to determine if there is a relative change between the locations of the transmitter i and the receiver j. Specifically, $d_{i,j}$ is compared to a threshold $\gamma$, for a constant $\gamma>0$. When $d_{i,j}>\gamma$, the method proceeds to 450. Specifically, the difference in the measured temporal link signature, from the Nth transmitted signal, and its history is not due to normal temporal variations, but the measured link signature is that of a different link over a different channel (e.g., from a new transmission location), and as such a relative location change between the transmitter i and receiver j is detected.

More particularly, a movement of the transmitter may be detected when eh temporal link signature is different from the baseline temporal link signature. That is, movement of the transmitter is determined when the receiver location remains static, and the distance $d_{i,j}$ exceeds the threshold $\gamma$.

At 450, appropriate action is taken. The action taken when a transmitter is detected to be at a distinct location is application dependent. If it is determined that the unknown transmitter is transmitter i, then the process may begin anew to build a history of temporal link signature for the new link. On the other hand, if it is determined that the unknown transmitter is not transmitter i, then the process outlined in FIG. 4 may proceed back to 420 in anticipation of the next received signal, from the Nth transmitted signal, since the previously received signal is not considered in the history of temporal link signatures.

In one embodiment, in the case of the sensor motion detection or object security applications, where it is expected that no movement would occur, a cooperative sensor localization methodology may be implemented, as discussed below. In other cases, an alarm may be triggered leading to other actions, such as pointing cameras to a particular location, physically investigating why there was movement detected, etc.

In another application, when a replication attack is suspected, the receiver might collaborate with other receivers to confirm the change in the location of node i (from the unknown transmitter), or an authentication process or re-authentication process may be implemented with the unknown transmitter. For instance, if re-authentication fails, then the Nth transmitted signal may be determined to be from an adversary transmitter, and not transmitter i. Specifically, an adversary transmitter posing as the transmitter i can be determined when the receiver location remains static, the distance $d_{i,j}$ exceeds the threshold $\gamma$, and the re-authentication process fails. An alarm may also be triggered when the replication attack is verified, or suspected.

On the other hand, if the difference is less than the threshold, then the method proceeds to 460 and adds the temporal link signature into the history of temporal link signatures. Specifically, when $d_{i,j}$ is less than the threshold $\gamma$, the measurement is assumed to be from the same link (e.g., channel between transmitter i and receiver j), such that $h_{i,j}^{(N)} = \overline{h}^{(N)}$. Thereafter, the temporal link signature is included in the history, $\mathcal{H}_{i,j}$. In one embodiment, for constant memory usage, the oldest measurement in $\mathcal{H}_{i,j}$ can be discarded.

Thereafter, the method returns to 420 in anticipation for the N+1 measurement.

Figure 5:
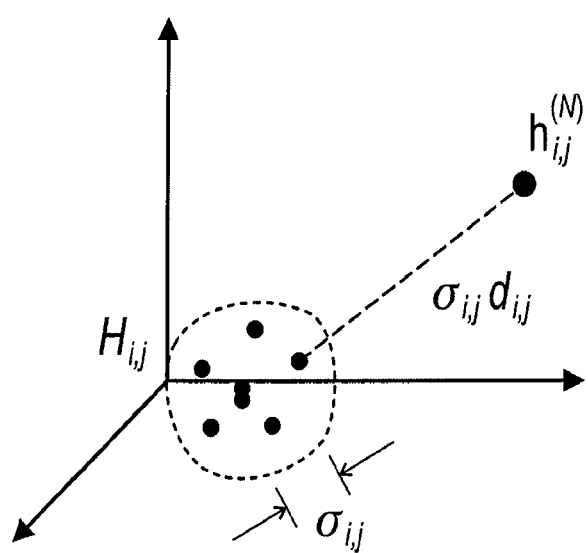
FIG. 5 is a diagram of a history of temporal link signatures, in accordance with one embodiment of the present invention.

FIG. 5 is a diagram 500 illustrating a history $\mathcal{H}_{i,j}$ of temporal link signatures, new measurement $h^{(N)}$, and a dotted line connecting $h^{(N)}$ to its closest point in the history. The diagram 500 is illustrative of flow diagram 400, in accordance with one embodiment of the present invention. The normalized distance $d_{i,j}$ is the length of the line divided by $\sigma_{i,j}$.

In one embodiment, FIG. 5 is analogous to a clustering algorithm operating on high-dimensional data. In one embodiment, it is not assumed that points in $\mathcal{H}_{i,j}$ come from a particular distribution. Instead, the spread of the points in the cluster (history) is quantified as the average distance between pairs of points in the cluster in Eq. 7.

$$\sigma_{i,j} = \frac{1}{(N-1)(N-2)} \sum_{g \in H_{i,j}} \sum_{h \in H_{i,j} \setminus g} \|h - g\|. \qquad (7)$$

The normalization constant $$\frac{1}{(N-1)(N-2)}$$

comes from N−1 size of the history set, $\mathcal{H}_{i,j}$. In one embodiment, half of the terms $\|h-g\|$ are calculated since the distance is symmetric.

Evaluation Methodology

In one embodiment, a methodology is described for determining the accuracy of the location distinction process of embodiments of the present invention. First, a methodology is developed to demonstrate that the link signature due to a transmitter at a location i' and the receiver at a location j, is different from the link signature history between i and j, where i'≠i by more than the threshold $\gamma$. This difference is denoted by $d_{i\text{-}i',j}$ and is referred to as the spatial link difference.

Second, the link signature measured while the transmitter is at the same location i and the receiver is at j, will be different from the link signature history between i and j by less than the threshold $\gamma$. This difference is denoted by $d_{i,j}^{(N)}$, and is referred to as the temporal link difference.

As such, the location change detection test can be viewed as a choice between two events $H_0$ and $H_1$, in which these terms are defined as follows in Eqs. 8A and 8B.

$$H_0: d_{i,j} = d_{i,j}^{(N)} \quad (8A)$$

$$H_1: d_{i,j} = d_{i-v,j} \quad (8B)$$

Since $d_{i,j}$s are random variables, their conditional density functions are denoted $f_{d_{i,j}}(d|H_0)$ and $f_{d_{i,j}}(d|H_1)$. Detection theory gives the performance of a detector, using the probability of false alarm $P_{FA}$ and probability of detection $P_D$, as follows in Eqs. 9A and 9B.

$$P_{FA} = \int_{x=\gamma}^{\infty} f d_{i,j}(x|H_0) dx \quad (9A)$$

$$P_D = \int_{x=\gamma}^{\infty} f d_{i,j}(x|H_1) dx \quad (9B)$$

It is important to note that the probability of missed detection is referred to as $P_M$, where $P_M = 1 - P_D$. Since the probabilities are a function of $\gamma$, the lower false alarm rate can be traded for lower probability of detection, and vice versa.

Collaborative Sensor Receivers

As shown in FIG. 1, multiple receivers can be used for a more robust system for determining location distinction, in accordance with one embodiment of the present invention. In particular, the present embodiment relies on the collaboration between two or more nodes (receivers).

In sensor networks, although collaboration may expend additional communication energy, it may be used in order to confirm with higher reliability that a transmitter's location has changed. Sensor and ad hoc networks typically rely on redundancy of links, so each node is expected to have multiple neighbors. For prevention of replication attacks, collaboration may be normal, and any access points in radio range would collaborate, in one embodiment. For example, WLAN coverage regions often overlap, and hence multiple access points may receive signals from the same transmitter. As WLANs become more ubiquitous, access point densities may increase and would create more overlap.

Figure 6:
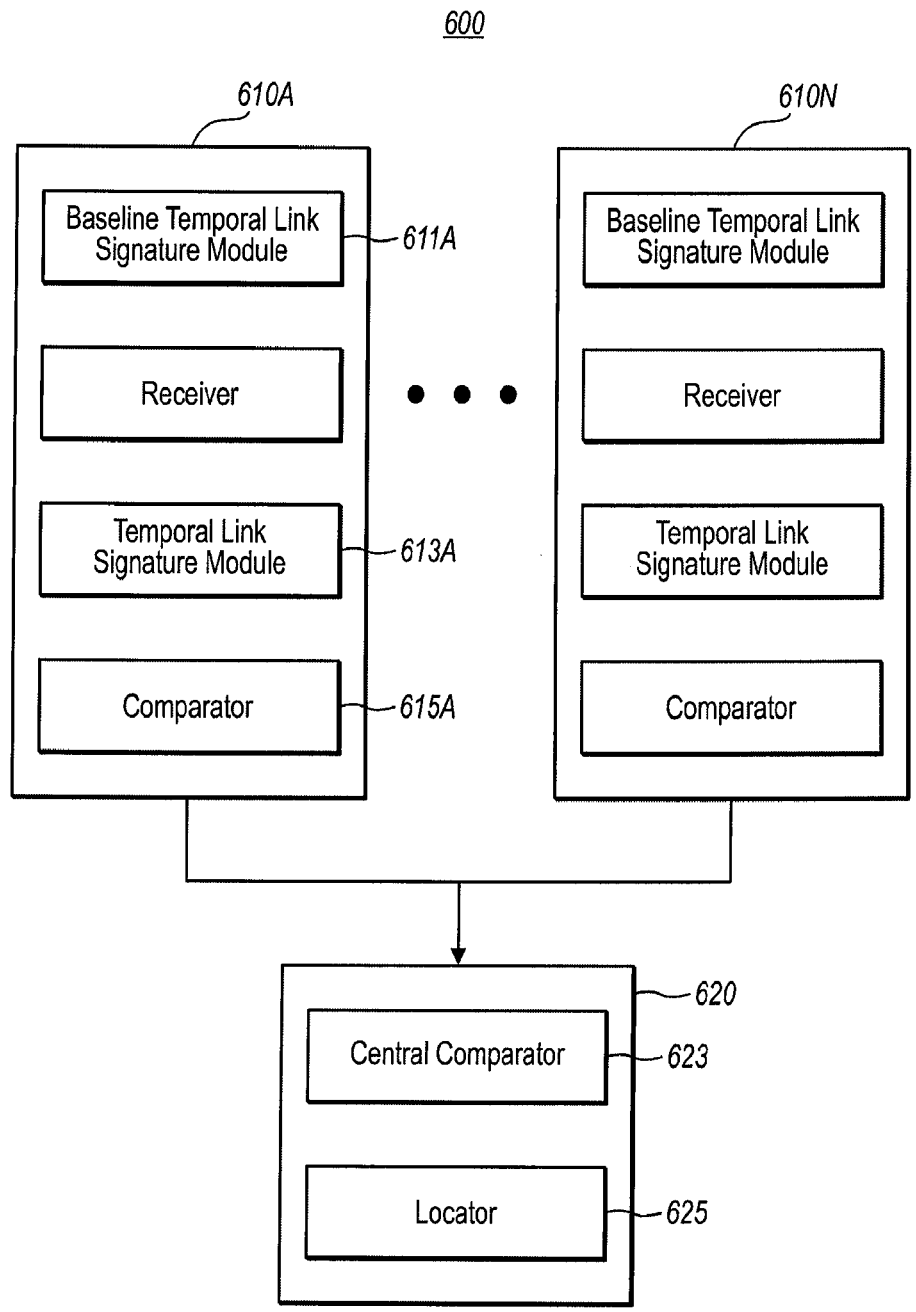
FIG. 6 is a block diagram of a system including multiple receivers for implementing a method for location distinction, in accordance with one embodiment of the present invention.

FIG. 6 is a block diagram of a system 600 including multiple receivers for implementing a method for location distinction, in accordance with one embodiment of the present invention. As shown in FIG. 6, each of the multiple receivers 610A-N is analogous to the system 300 shown in FIG. 3. As such, each of the multiple receivers 610A-N includes a baseline temporal link signature module, a receiver for receiving a transmitted signal, a temporal link signature module, and a comparator. In addition, a central module 620 is communicatively coupled with each of the multiple receivers 610A-N. The central module 620 includes a central comparator 623 and a locator 625.

For purposes of discussion, the term $\mathcal{J}$ is defined to be the set of receivers 610A-N involved in the collaborative location distinction process for transmitter i. The process proceeds as follows:

Each node $j \in \mathcal{J}$ records a history $\mathcal{H}_{i,j}$ with length N-1. An average difference $\sigma_{i,j}$ between the link signatures in the history can be calculated. For instance, each of the baseline temporal link signature modules (e.g., 611A) records the history of temporal link signatures for a corresponding node.

In addition, each node records the new, Nth temporal link signature $h^{(N)}$ and calculates the distance $d_{i,j}$ between it and the history, as in Eq. 6. For instance, the each of the temporal link signature modules (e.g., 613A) calculates or determines the Nth temporal link signature $h^{(N)}$ for a corresponding node. In addition, each of the comparators (E.g., 615A) is able to calculate the distance $d_{i,j}$ between it and the history of temporal link signatures associated with its corresponding node.

For collaboration, in one embodiment nodes $j \in \mathcal{J}$ send differences $d_{i,j}$ to a central processor, or central comparator 623, which then combines the results into a mean distance $d_{i,\mathcal{J}}$, represented as follows in Eq. 10. In one embodiment, the central comparator 623 is located in one of the receivers. In another embodiment, the central comparator 623 is at a remote location, different from any of the receivers. Eq. 10 is listed below.

$$d_{i,\mathcal{J}} = \frac{1}{|\mathcal{J}|} \sum_{j \in \mathcal{J}} d_{i,j} \quad (10)$$

In the central comparator 623, the result $d_{i,\mathcal{J}}$ is compared to a threshold $\gamma$. If the difference is above the threshold, it can be determined that the new measurement is from a different transmitter location, in one embodiment. Otherwise, it can be determined that the new measurement is from the same transmitter location. This process is similar to the process outlined in 440, 450, and 460. As such, each receiver adds $h_{i,j}^{(N)} = h^{(N)}$ (N)=$h^{(N)}$ to its history for the link (i,j).

In addition, denoting $d_{i,j}^{(N)}$ to be the temporal link difference, and $d_{i-v,j}$ to be the spatial link difference, a choice can be made between the two events in Eqs. 11A and 11B, in another embodiment.

$$H_0: d_{i,j} = d_{i,j}^{(N)} \quad (11A)$$

$$H_1: d_{i,j} = d_{i,\mathcal{J}} \quad (11B)$$

The conditional density functions (pdfs) are now denoted $f_{d_{i,\mathcal{J}}}(d|H_0)$ and $f_{d_{i,\mathcal{J}}}(d|H_1)$. In addition, the probability of false alarm, $P_{FA}$, and probability of detection, $P_D$ are determined in Eqs. 12A and 12B.

$$P_{FA} = \int_{x=\gamma}^{\infty} f d_{i,\mathcal{J}}(x|H_0) dx \quad (12A)$$

$$P_D = \int_{x=\gamma}^{\infty} f d_{i,j}(x|H_1) dx \quad (12B)$$

Furthermore, locator 625 is used to determine a location of the transmitter, in one embodiment. Given the received signals at each of the multiple receivers 610A-N, a location algorithm may be used to determine a geographic location of the transmitter, knowing the locations of each of the multiple receivers 610A-N. As such, not only can a change in location between the relative positions of a transmitter and receiver be determined, but the geographic location of the transmitter can be determined to substantiate the change in location.

As a result, embodiments of the present invention that provide location distinction in wireless networks can be implemented in various applications, such as for purposes of providing wireless security for wireless networks, active RFID, wireless sensor networks, forensics information, etc. For instance, for purposes of wireless security, when a imposter is detected, a re-authentication process may be triggered. In the case of active RFID, when movement is detected, corrective action can be taken, such as confirming that the movement occurred through video, or physical investigation, or additional transmission at higher power for triangulation. Further, in wireless sensor networks, if movement is detected, multiple receiver collaboration can be activated to verify the movement. Also, in the field of forensics, embodiments of the present invention are capable of identifying the location from which a network break-in was committed. That is, through correlation of event timing, location distinction can be implemented to provide additional information showing that a breach occurred.

A method and system for determining location distinction in wireless networks is thus described. While the invention has been illustrated and described by means of specific embodiments, it is to be understood that numerous changes and modifications may be made therein without departing from the spirit and scope of the invention as defined in the appended claims and equivalents thereof. Furthermore, while the present invention has been described in particular embodiments, it should be appreciated that the present invention should not be construed as limited by such embodiments, but rather construed according to the below claims.

What is claimed:

1. A method for location distinction, comprising:
   determining a baseline temporal link signature of a channel between a transmitter located at a first location and a receiver at a second location, wherein said baseline temporal link signature is characteristic of a first impulse response of at least one transmitted signal over said channel, the transmitted signal comprising a plurality of multipath signal components, each multipath signal component including a time delay and an amplitude, wherein the baseline temporal link signature is based on the amplitude of each multipath signal component at each time delay;
   receiving a signal at said receiver based on a second transmitted signal from an unknown transmitter at an unknown location;
   determining a temporal link signature based on said second signal that is received, wherein said temporal link signature is characteristic of a second impulse response of said second transmitted signal over an unknown channel between said unknown transmitter and said receiver; and
   detecting a change between said first location and said second location by determining if said temporal link signature is different from said baseline temporal link signature,
   wherein said detecting a change comprises:
      performing an authentication process with said transmitter; and detecting that said unknown transmitter is posing as said transmitter when said temporal link signature is different from said baseline temporal link signature and when said authentication process fails, wherein said second location of said receiver is static.

2. The method of claim 1, wherein said detecting a change comprises:
   detecting a movement of said transmitter when said temporal link signature is different from said baseline temporal link signature, wherein said second location of said receiver is static.

3. The method of claim 1, wherein said determining a temporal link signature further comprises: normalizing said second impulse response.

4. The method of claim 1, wherein said determining a baseline temporal link signature comprises:
   storing a history of temporal link signatures determined from a plurality of transmitted signals from said transmitter;
   determining a plurality of distances between said temporal link signature and each of said history of temporal link signatures;
   determining a closest distance in said plurality of distances; and
   selecting a representative temporal link signature from said history of temporal link signatures as said baseline temporal link signature, wherein said representative temporal link signature is associated with said closest distance.

5. The method of claim 4, wherein said detecting a change comprises:
   comparing said closest distance to a threshold; and
   detecting said change between said first location and said second location when said closest distance exceeds said threshold.

6. The method of claim 4, wherein said detecting a change comprises:
   comparing said closest distance to a threshold;
   detecting no change between said first location and said second location when said closest distance does not exceed said threshold; and
   adding said representative temporal link signature to said history of temporal link signatures.

7. The method of claim 1, further comprising:
   determining said second transmitted signal from said received signal;
   comparing said second transmitted signal to an identification signal associated with said transmitter; and presuming said unknown transmitter is said transmitter when said second transmitted signal is substantially similar to said identification signal.

8. A system for determining location distinction, comprising:
   a baseline temporal signature module for determining a baseline temporal link signature of a channel between a transmitter located at a first location and a receiver at a second location, wherein said baseline temporal link signature is characteristic of a first impulse response of at least one transmitted signal over said channel, the transmitted signal comprising a plurality of multipath signal components, each multipath signal component including a time delay and an amplitude, wherein the baseline temporal link signature is based on the amplitude of each multipath signal component at each time delay;
   said receiver for receiving a signal based on a second transmitted signal from an unknown transmitter at an unknown location;
   a temporal link signature module for determining a temporal link signature based on said second signal that is received, wherein said temporal link signature is characteristic of a second impulse response of said second transmitted signal over an unknown channel between said unknown transmitter and said receiver; and
   a comparator for detecting a change between said first location and said second location by determining if said temporal link signature is different from said baseline temporal link signature, wherein said detecting a change comprises:
   performing an authentication process with said transmitter; and detecting that said unknown transmitter is posing as said transmitter when said temporal link signature is different from said baseline temporal link signature and when said authentication process fails, wherein said second location of said receiver is static.

9. The system of claim 8, further comprising:
   a second receiver for receiving a second signal based on said second transmitted signal, wherein said second receiver is not co-located with said receiver, and
   wherein said second receiver determines a second temporal link signature based on said second signal; and
   a central comparator for detecting said change between said first location and said second location based on said temporal link signature, said second temporal link signature, and said baseline temporal link signature.

10. The system of claim 8, further comprising:
a locator for determining a location of said unknown transmitter based on said signal received at said receiver and said second signal received at said second receiver.

11. A method for location distinction, comprising:
determining a baseline temporal link signature of a channel between a transmitter located at a first location and a receiver at a second location, wherein said baseline temporal link signature is characteristic of a first impulse response of at least one transmitted signal over said channel, the transmitted signal comprising a plurality of multipath signal components, each multipath signal component including a time delay and an amplitude, wherein the baseline temporal link signature is based on the amplitude of each multipath signal component at each time delay;
receiving a signal at said receiver based on a second transmitted signal from an unknown transmitter at an unknown location;
determining a temporal link signature based on said second signal that is received, wherein said temporal link signature is characteristic of a second impulse response of said second transmitted signal over an unknown channel between said unknown transmitter and said receiver; and
detecting a change between said first location and said second location by determining if said temporal link signature is different from said baseline temporal link signature,
wherein said determining a baseline temporal link signature comprises:
storing a history of temporal link signatures determined from a plurality of transmitted signals from said transmitter;
determining a plurality of distances between said temporal link signature and each of said history of temporal link signatures;
determining a closest distance in said plurality of distances; and
selecting a representative temporal link signature from said history of temporal link signatures as said baseline temporal link signature, wherein said representative temporal link signature is associated with said closest distance.

12. A system for determining location distinction, comprising:
a baseline temporal signature module for determining a baseline temporal link signature of a channel between a transmitter located at a first location and a receiver at a second location, wherein said baseline temporal link signature is characteristic of a first impulse response of at least one transmitted signal over said channel, the transmitted signal comprising a plurality of multipath signal components, each multipath signal component including a time delay and an amplitude, wherein the baseline temporal link signature is based on the amplitude of each multipath signal component at each time delay;
said receiver for receiving a signal based on a second transmitted signal from an unknown transmitter at an unknown location;
a temporal link signature module for determining a temporal link signature based on said second signal that is received, wherein said temporal link signature is characteristic of a second impulse response of said second transmitted signal over an unknown channel between said unknown transmitter and said receiver; and
a comparator for detecting a change between said first location and said second location by determining if said temporal link signature is different from said baseline temporal link signature,
wherein said determining a baseline temporal link signature comprises:
storing a history of temporal link signatures determined from a plurality of transmitted signals from said transmitter;
determining a plurality of distances between said temporal link signature and each of said history of temporal link signatures;
determining a closest distance in said plurality of distances; and
selecting a representative temporal link signature from said history of temporal link signatures as said baseline temporal link signature, wherein said representative temporal link signature is associated with said closest distance.

* * * * *